United States Patent [19]
Mabbott

[11] Patent Number: 5,642,788
[45] Date of Patent: Jul. 1, 1997

[54] DISMOUNT BRAKING DEVICE FOR A SNOWMOBILE

[76] Inventor: David E. Mabbott, Route 1 Box 1542, Hermiston, Oreg. 97838

[21] Appl. No.: 555,184

[22] Filed: Nov. 8, 1995

[51] Int. Cl.[6] ................................................. B60T 7/14
[52] U.S. Cl. ............................ 180/272; 303/19; 303/89; 188/353
[58] Field of Search ................................ 180/272, 273, 180/275, 271, 190; 303/19, 18, 89, 13; 188/353, 109, 110, 2 D

[56] References Cited

U.S. PATENT DOCUMENTS

| | | | |
|---|---|---|---|
| 2,296,132 | 9/1942 | Wiseley | 188/353 |
| 2,362,324 | 11/1944 | Stromberg | 303/18 |
| 2,585,711 | 2/1952 | Whitney et al. | 303/89 |
| 2,924,423 | 2/1960 | Weiser et al. | 303/18 |
| 3,260,554 | 7/1966 | Heiland | 303/18 |
| 3,360,305 | 12/1967 | Ryskamp | 180/273 |
| 3,684,045 | 8/1972 | Samuelson | 180/190 |
| 3,825,092 | 7/1974 | Graydon et al. | 180/272 |
| 3,888,552 | 6/1975 | Fontaine | 303/89 |
| 3,957,131 | 5/1976 | Perkins | 180/272 |

*Primary Examiner*—Brian L. Johnson
*Assistant Examiner*—Peter C. English
*Attorney, Agent, or Firm*—David George Johnson

[57] ABSTRACT

A dismount brake device (1) is tethered by a cable (4) to a snowmobile rider (3). Pulling on the cable (4) displaces a trigger (17) which frees a piston (34). The piston (34) is biased by a main spring (39) to decrease the volume of a chamber (11) containing hydraulic fluid and which is interconnected to the brake line (13). A plunger (36) extends from the head of the piston (34) and seals a port (40) leading to the master cylinder (42). As the volume of the chamber (11) continues to decrease, the pressure in the brake line (13) reaches a value that will activate the brakes and stop rotation of snowmobile track (47). Activation of the brake handle (46) resets the device (1) for further use. An alternate embodiment (48) utilizes a solenoid (50) instead of the tether (4) to physically move a modified trigger (56) when a switch senses that the seat (64) of the snowmobile (2) is unoccupied.

18 Claims, 8 Drawing Sheets

5,642,788

DISMOUNT BRAKING DEVICE FOR A SNOWMOBILE

FIELD OF THE INVENTION

The present invention relates generally to the field of circuit continuity interlock or interrupt devices, and more specifically to a braking system for snowmobiles that will automatically stop the snowmobile in the event of rider dismount.

DESCRIPTION OF RELATED TECHNOLOGY

Snowmobiles have as an inherent design characteristic a lack of seatbelts or other restraining devices which would prevent separation of the rider from the vehicle in the event that the operator loses control of the vehicle. This is usually a desirable condition, however, because loss of control often results in a lateral rollover of the snowmobile which would injure the snowmobile riders if they were still attached to the vehicle. Unfortunately, the snowmobile often regains some semblance of stability once the rider leaves the vehicle. This results in the dangerous situation of a riderless snowmobile travelling at speeds sufficient to cause injury or damage to whatever is encountered by the pilotless vehicle. As a practical matter, the dazed and dismounted snowmobile operator is usually in no condition to catch up with the moving vehicle as it continues its travels through waist deep snow.

Snowmobiles used primarily for racing are often equipped with an engine "kill" switch which is tethered to the rider. Upon accidental dismount, the engine no longer produces power. Due to the transmission characteristics of the typical snowmobile, however, the snowmobile is free to continue forward travel after the engine stops and so any downward incline or level, icy surface will result in the potential for the snowmobile to travel a considerable distance. The engine "kill" switch is intended to stop the snowmobile engine in a racing environment, thereby stopping the spark produced by the ignition system and reducing the danger of fire or explosion in the event of a fuel leak or spill. This does not, however, stop the snowmobile itself.

In forests and mountainous terrain, a runaway snowmobile presents a special problem. Once the rider is accidentally removed from the snowmobile the vehicle can in some circumstances travel great distances. The typical snowmobile weighs approximately five hundred pounds, and so considerable momentum can be developed. Even if the snowmobile is eventually stopped by a tree or rock, the damage to the snowmobile itself can be considerable.

SUMMARY OF THE INVENTION

The present invention addresses the problem of stopping the forward momentum of a riderless snowmobile by engaging the existing snowmobile brake and stopping the snowmobile track. The snowmobile brake described herein does not interfere with the normal function of the snowmobile braking system, and operates quickly and reliably in the event of rider dismount. Further, the present invention may be easily deactivated once the rider returns to the snowmobile to continue his journey. Installation of the present invention onto an existing snowmobile is straightforward, and can be activated or deactivated at the discretion of the rider. The present invention also activates the dash mounted hydraulic pressure status light already present on many snowmobiles as an indication to inform the returning rider that the braking system must be released before further use.

DETAILED DESCRIPTION OF THE PREFERRED EMBODIMENTS

Figure 1:
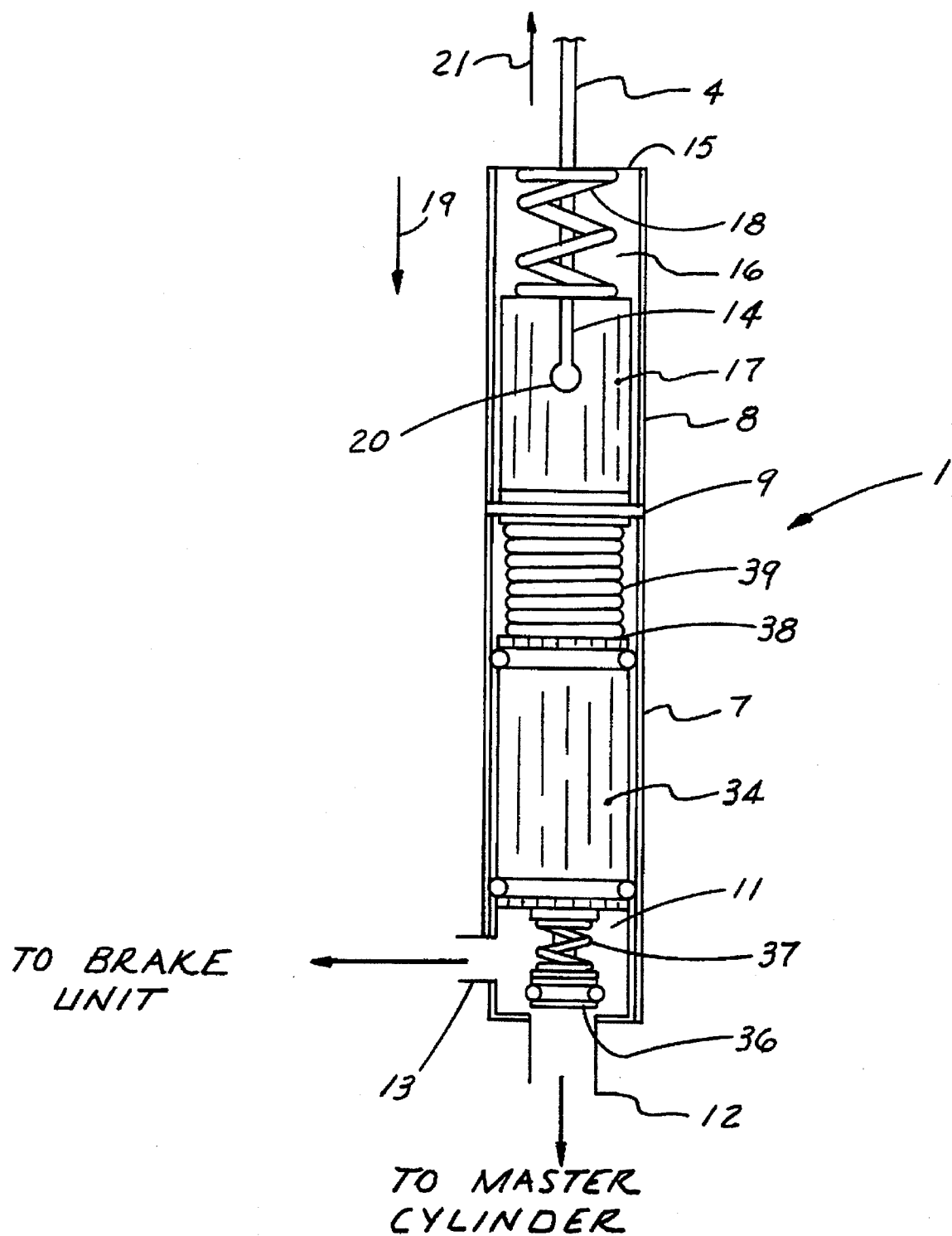
FIG. 1 is a side elevation of a brake activation device constructed according to the principles of the present invention, shown in a first, dormant position.
Figure 4:
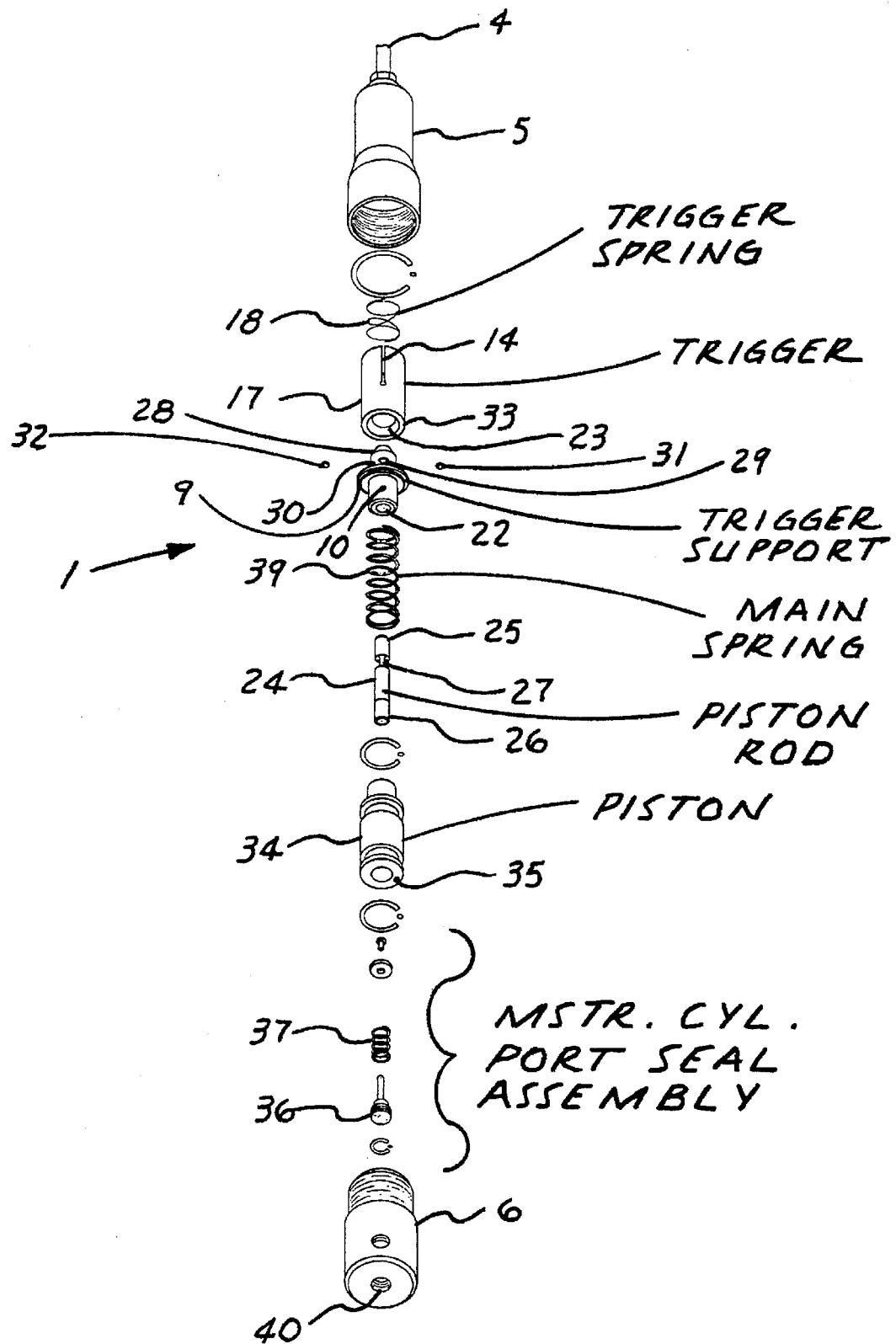
FIG. 4 is a perspective view of the device depicted in FIG. 1 showing the components in an expanded, separated relationship.
Figure 7:
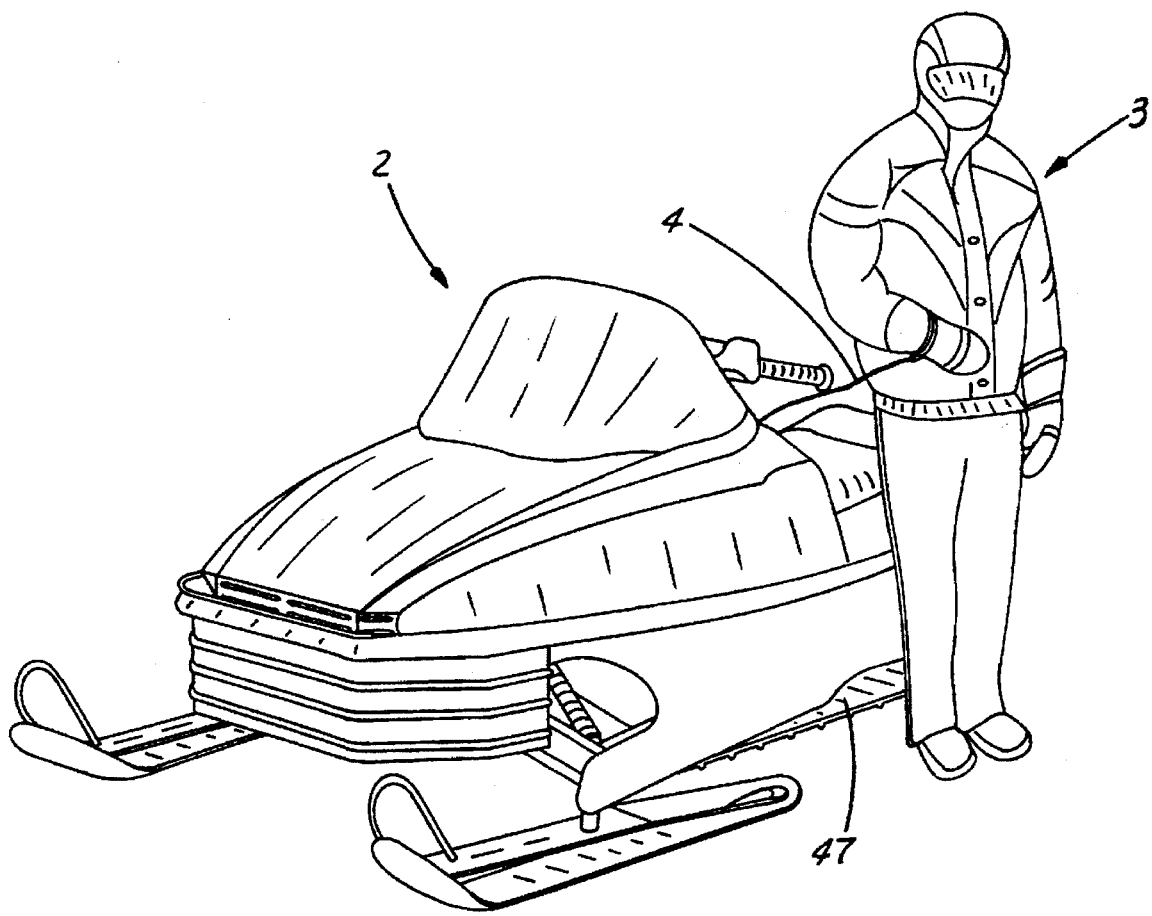
FIG. 7 is a perspective view of a snowmobile and rider to which a tether of the present invention is attached.

Referring to FIGS. 1, 4 and 7, the dismount braking device of the present invention is shown generally at 1. The device 1 is mounted permanently to a snowmobile 2 and is tethered to a rider 3 by means of a cable 4. The device is mounted within a housing formed of a first half 5 and a second half 6 which are typically threaded to permit a rigid attachment to each other and to form a single, unitary housing. The interior wall 7 of the second housing half and the interior wall 8 of the first housing half together define a bore within which the remaining components of brake 1 are retained. The interior bore of the housing is divided by the shoulder 9 of trigger support 10, the trigger support 10 thereby being the one interior component within the housing which remains stationary with respect to the housing halves 5 and 6 during operation of the device 1.

The second housing half 6 is formed so as to include a lower chamber 11 which is interconnected by means of a suitable hose or conduit 12 to the master cylinder 42 (FIG. 5) which is already present on the snowmobile 2 as part of its original, factory installed brake system. Also interconnected to the chamber 11 is a conduit 13 which is connected to the hydraulically operated brake discs, shoes or other braking elements. Thus, as shown in FIG. 1, any hydraulic fluid present in the braking system of snowmobile 2 is free to travel from the master cylinder through pipe 12 which links master cylinder to inlet port 40 which enters reservoir or chamber 11, and is free to continue travelling through outlet port 71 into conduit 13 to the remainder of the snowmobile's existing brake system.

The cable 4 enters the first housing half 5 through a suitable hole (not shown) drilled through its upper surface 15. This permits the cable 4 to enter the interior chamber 16 of housing half 5. Slidably mounted within chamber 16 is a trigger 17 having another cylindrical shell with a diameter to permit it to slide within the bore of first housing half 5. A trigger spring 18 is mounted within the chamber 16 so as to bias the trigger 17 in the direction indicated by arrow 19. Formed within the sidewall of trigger 17 is a slot 14 terminating at a circular opening 20. An enlarged bulb (not shown) on the end of cable 4 is inserted through opening 20, thereby permitting the cable to pass through the slot 14 and to be retained thereby. Pulling on the cable by rider 3 will result in movement of the cable in the direction of arrow 21.

As depicted in FIG. 1, the dismount braking device 1 is shown in its dormant, untriggered position, that is, the snowmobile brakes are free to operate based on inputs from the master cylinder and the cable 4 has not been pulled.

The trigger 17 is biased downwardly by the trigger spring 18, the limit of travel of the trigger 17 in the direction of arrow 19 being defined by the presence of shoulder 9. Within the trigger support 10 is formed a bore 22, which is coaxial with a bore 23 formed within the trigger 17. A piston rod 24 slides within the bore 22 and extends into the bore 23. The piston rod 24 is formed to have a first end 25 joined to a second end 26 by means of a neck 27. Formed within the sidewall 28 of trigger support 10 are a series of orifices 29 and 30, for example, which are substantially circular in shape and which have a diameter sufficient to permit ball bearings 31 and 32 to pass therethrough. When the trigger 17 is in the position shown in FIG. 1, that is, the lower edge 33 abuts shoulder 9, the neck 27 of the piston rod 24 is adjacent to the orifices 29 and 30. The ball bearings 31 and 32 are placed within the orifices 29 and 30, respectively, and the trigger 17 is urged toward the shoulder 9 as previously described. This results in the inner walls of trigger 17 which define bore 23 of the trigger 17 to press against the ball bearings 31 and 32, which are prevented from falling completely through the orifices 29 and 30 by the presence of neck 27. The effect of the pressure exerted by trigger 17 against ball bearings 31 and 32 is to grip neck 27 and prevent movement of piston rod 24.

The second end 26 of piston rod 24 is interconnected to a piston 34. Protruding from the outer surface 35 of piston 34 is a plunger 36 which is biased in the direction of arrow 19 by spring 37. The piston 34 is also biased to travel in the direction of arrow 19 by the main spring 39, which is retained between shoulder 9 and the inner surface 38 of piston 34. The effect of gripping neck 27 of piston rod 24 in a position adjacent to orifices 29 and 30 is to compress main spring 39 and to prevent plunger 36 from plugging inlet orifice 40 leading to conduit 12 which is Interconnected to the master cylinder.

Figure 2:
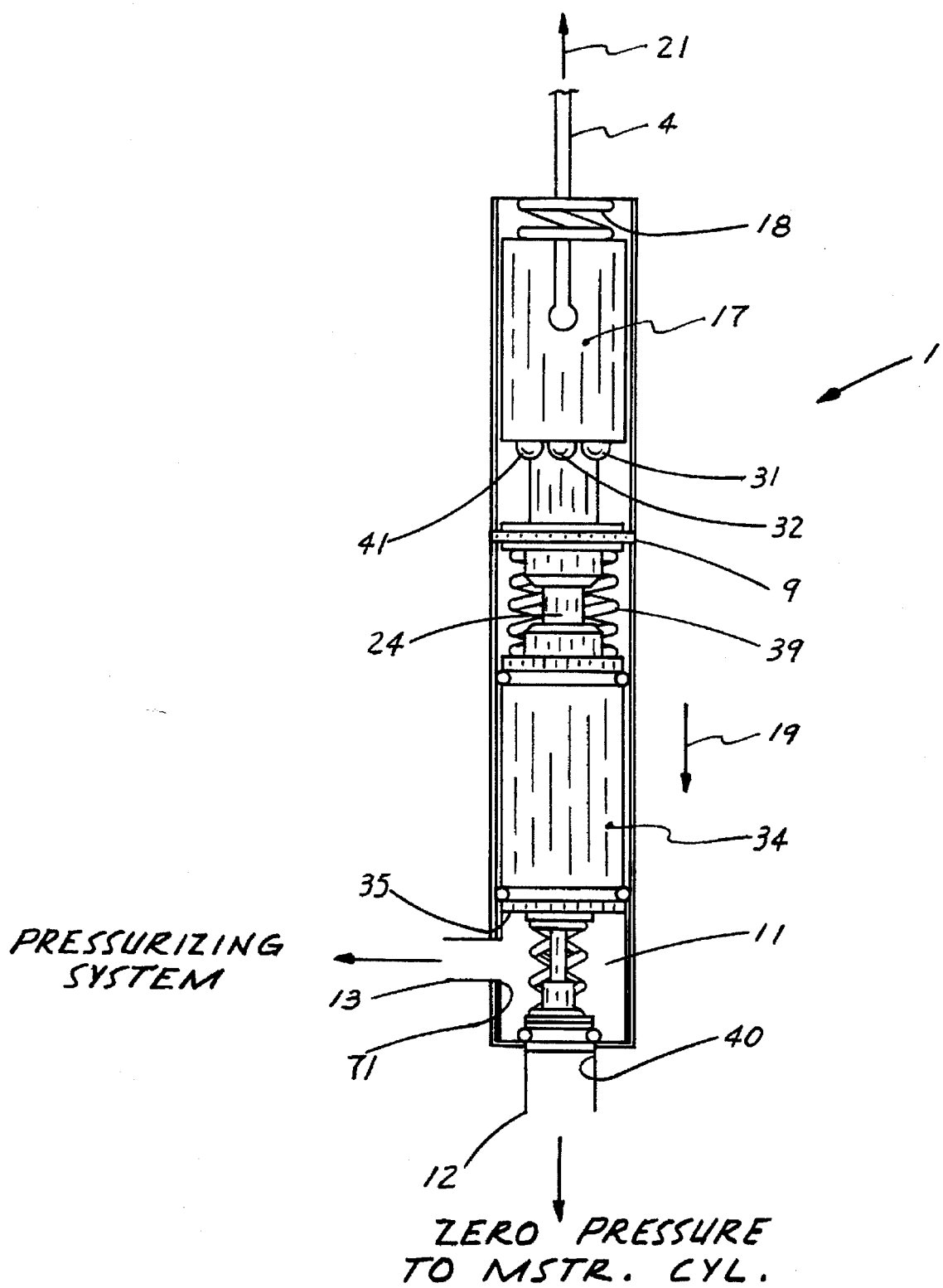
FIG. 2 is a side elevation of the device depicted in FIG. 1 shown in a second, master cylinder sealing position.

Referring now to FIG. 2, the cable 4 has been pulled and by suitable means "(such as severable member 70 shown in FIG. 6)" has afterwards become detached from the rider 3. The movement of the cable 4 in the direction of arrow 21 results in the compression of trigger spring 18 and the movement of trigger 17 in the direction of arrow 21. The inner bore 23 of trigger 17 is tapered so as to be somewhat wider in the region nearest shoulder 9 as compared to the region nearest trigger spring 18. This taper results in reducing the force exerted by the inner wall of trigger 17 against the ball bearings 31, 32 and 41 as the trigger 17 moves in the direction of arrow 21. As the ball bearings 31, 32 and 41 become free to travel radially outward from the longitudinal axis of piston rod 24, the neck 27 is no longer constrained and the force of main spring 39 pushes the piston 34 in the direction of arrow 19. As the piston 34 travels in the direction of arrow 19, the plunger 36 is urged into contact with master cylinder access port 40, thereby preventing flow of hydraulic fluid in chamber 11 into conduit 12.

Figure 3:
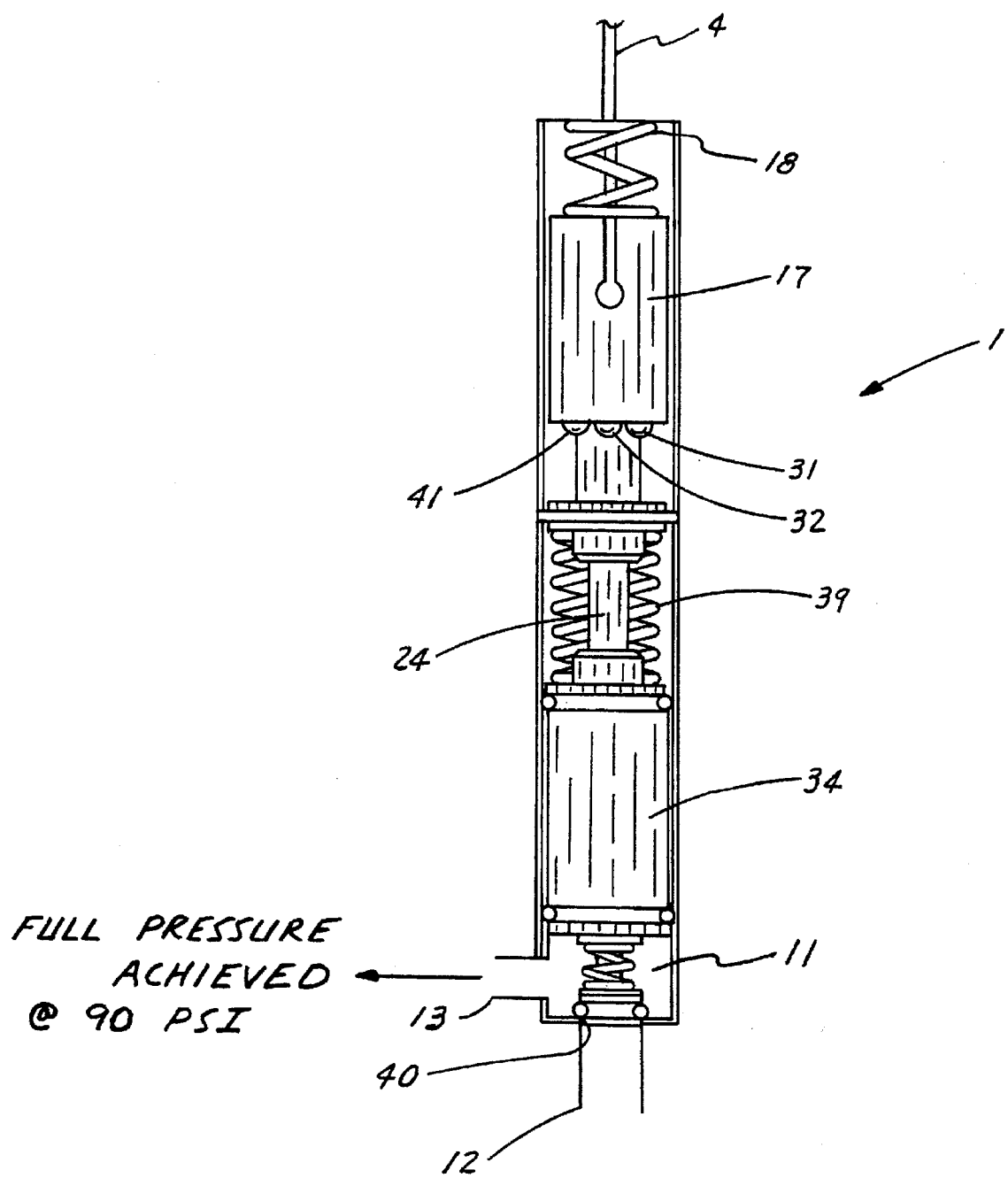
FIG. 3 is a side elevation of the device depicted in FIG. 1 shown in a third, fully pressurized position.

As the volume of chamber 11 decreases with the advance of the leading surface 35 of piston 34, the pressure within conduit 13, which is directly connected to the brakes, begins to increase. As seen in FIG. 2, the main spring 39 is only slightly expanded moments after the piston rod 24 is freed from the restraint imposed by the ball bearings 31, 32 and 41. Referring now to FIG. 3, the main spring 39 is substantially more elongated as the piston 34 continues to reduce the volume of chamber 11. This compression in the volume of chamber 11 further increases the pressure in brake line conduit 13 until a desired pressure, nominally 90 psi, is reached.

Figure 5:
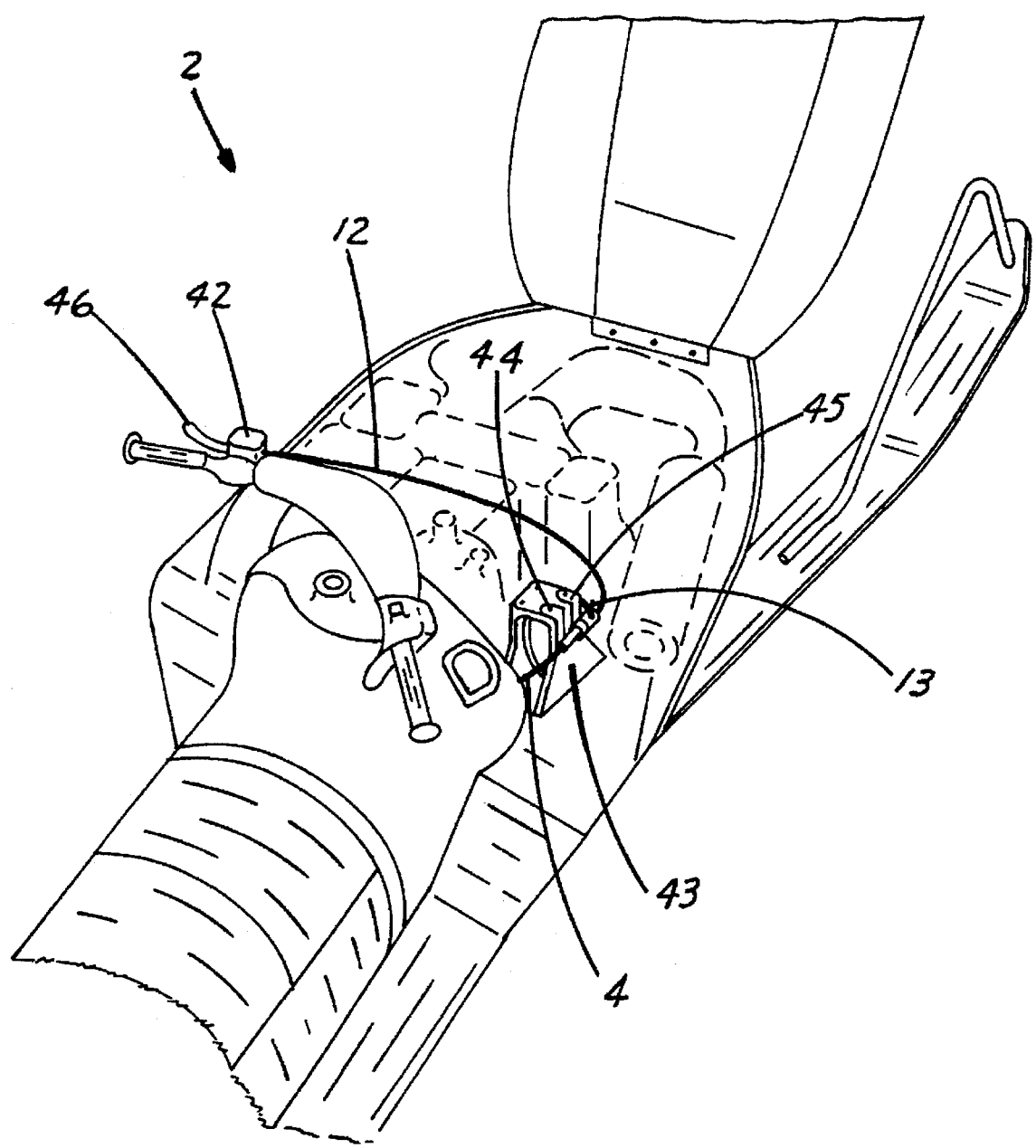
FIG. 5 is a perspective view of a portion of a snowmobile on which the device depicted in FIG. 1 is mounted.
Figure 6:
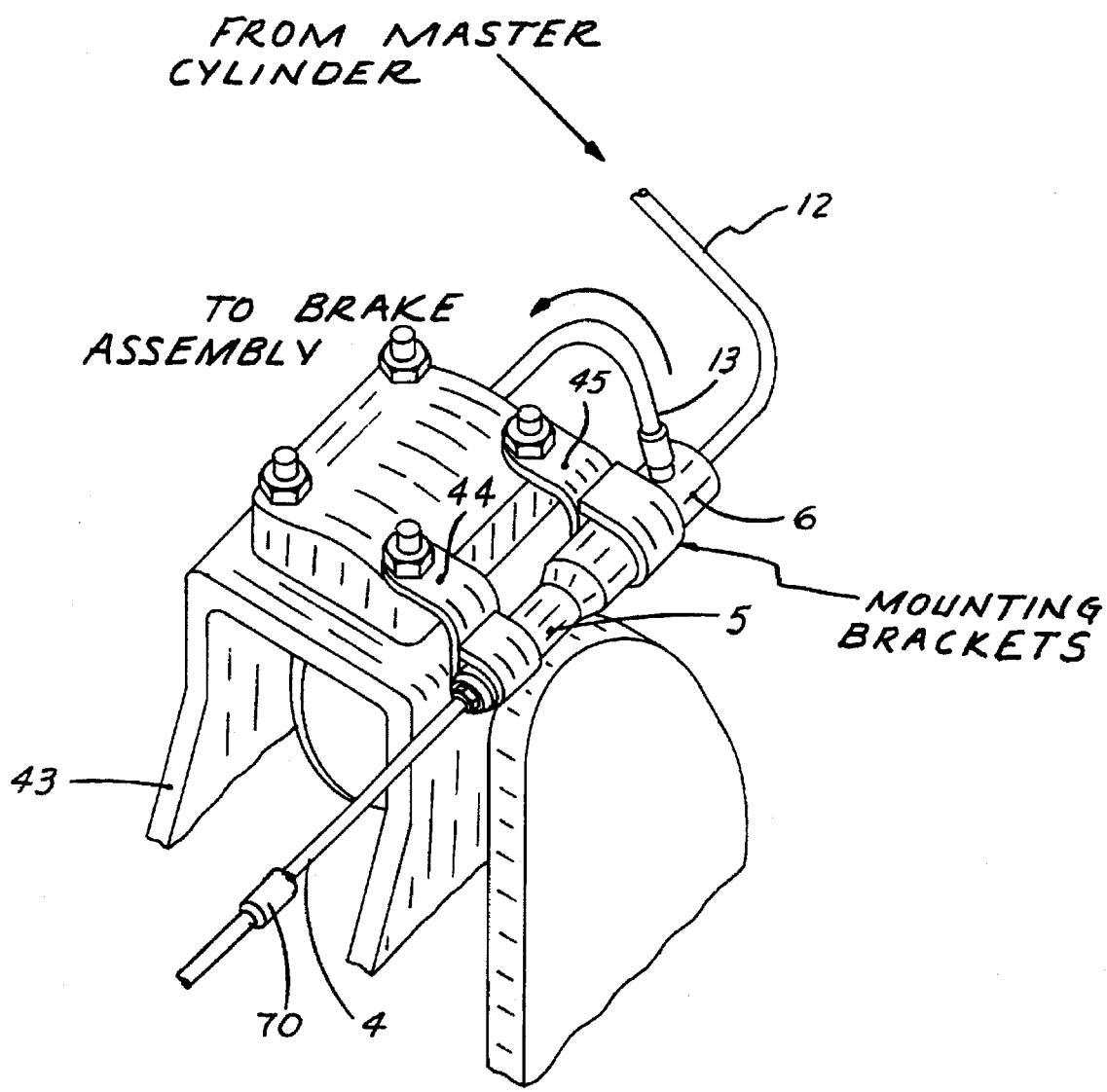
FIG. 6 is a perspective view showing details of the mounting arrangement depicted in FIG. 5.

The mounting of the dismount brake I onto a snowmobile 2 can best be understood by reference to FIGS. 5 and 6. The housing halves 5 and 6 are secured to a suitable existing structure 43 by means of mounting clamps 44 and 45. The cable 4 is oriented so as to be substantially coaxial with piston rod 24 so as to require the minimum amount of force to displace the trigger 17. Once the cable 4 has been pulled, the device 1 may be easily reset by depressing the bake lever 46, which will force hydraulic fluid through conduit 12 and into chamber 11. This will expand the volume of chamber 11 and force piston 34 to move in the direction of arrow 21, until eventually the neck 27 of piston rod 24 is gripped by the ball bearings 31, 32 and 41, thereby locking the device in the position depicted in FIG. 1.

One of ordinary skill in this field will appreciate that modifications and variations may be made on the present invention without departing from the spirit and scope of the claims appended hereto. For example, referring to FIG. 8, a second embodiment of the brake is shown generally at 48. In this embodiment, the upper housing half 69 is formed to included an upper flange 49. Rigidly affixed to the flange 49 is a low profile soft shift solenoid 50. Attachment to flange 49 is accomplished by means of studs 51 and 52, onto which are threaded nuts 53 and 54, respectively.

Within the housing half 69 is mounted the piston rod 24, which is substantially identical to the one already described. The piston rod 24 includes a first end 25, a second end 26 and a narrower, interconnecting neck 27. The piston rod 24 resides within the trigger support 10 and is constrained against movement by the spherical bearings 31 and 32 which reside in bores 55 and 30, respectively. The trigger 56 is formed as a hollow cylinder, the interior walls of which include indentations 57 and 58, for example. The trigger 56 includes an end plate 59 from which extends a shaft 60 generally in the direction of solenoid 50. The solenoid 50 includes a plunger 61 which extends generally toward shaft 60. A trigger spring 66 is mounted so as to abut the inner surface 67 of end plate 59, thereby urging the trigger 56 away from the trigger support 10 and generally in the direction of arrow 68.

Figure 8:
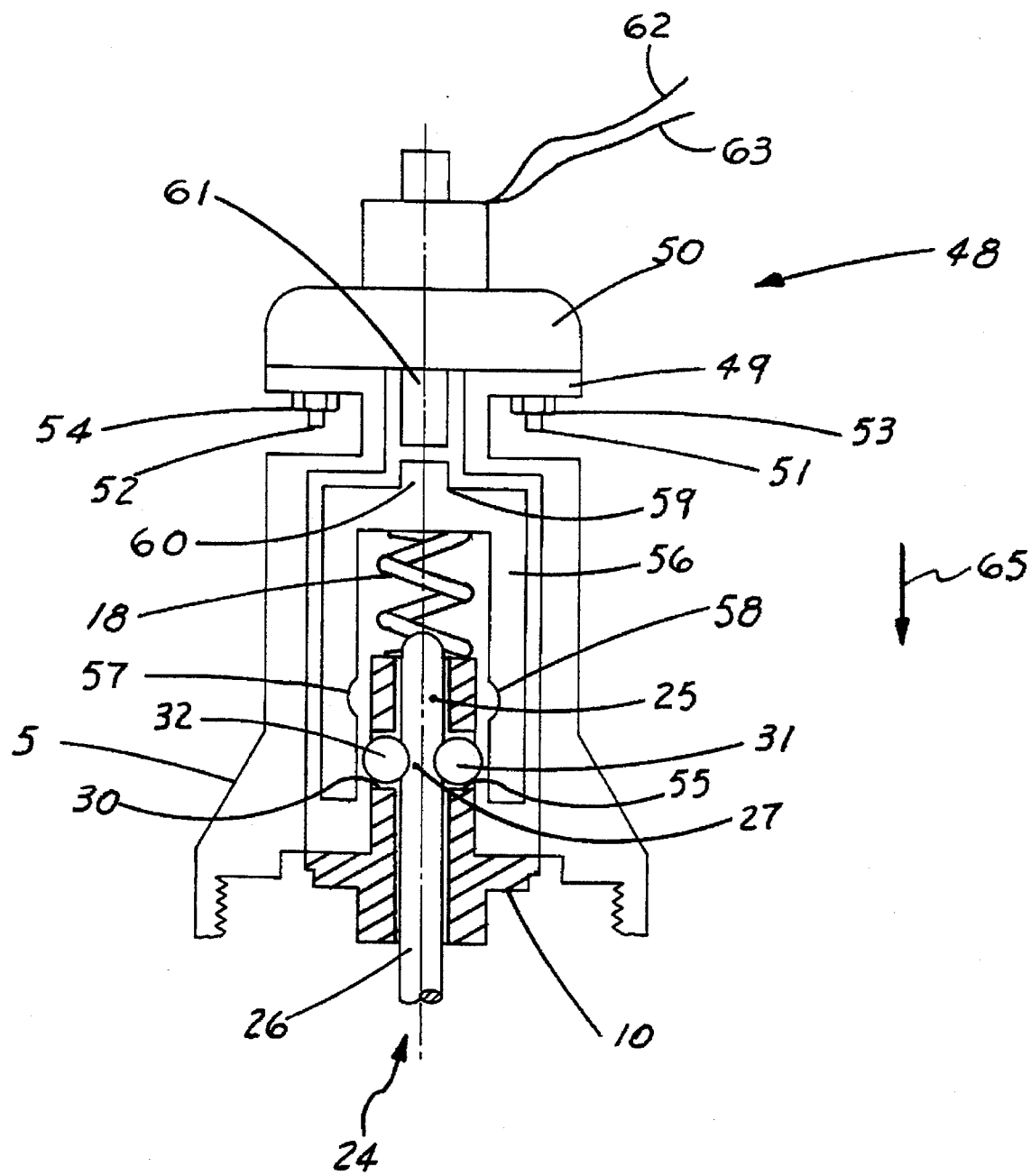
FIG. 8 s a side elevational section of a second embodiment of the invention depicted in FIG. 1.

As depicted in FIG. 8, the brake 48 is shown in its armed, undeployed state. The solenoid 50 is interconnect d by wires 62 and 63 to a suitable source of electric power (not shown) as would be typically found on the snowmobile 2. The wires 62 and 63 would typically be part of a series circuit which would include a normally closed switch (not shown) beneath seat 64 of snowmobile 2. When the rider 3 sat on the seat 64, the switch would be opened by the weight of the rider 3. The vehicle 2 would not be energized until the rider 3 was seated. If the rider 3 were to be subsequently dislodged from seat 64 when the vehicle 2 was still energized, the switch would revert to its normally closed position and the solenoid 50 would be activated. The application of power to solenoid 50 results in the extension of plunger 61 toward shaft 60, thereby forcing trigger 56 in the direction of arrow 65. Eventually the indentations 57 and 58 will reach a position adjacent to spherical bearings 31 and 32, thereby permitting piston rod 24 to activate the brake in the manner previously described for the earlier embodiment.

I claim:

1. A brake activation system comprising:

a. a housing, the housing having a longitudinal axis and a centrally located bore that is symmetrical about the longitudinal axis, the housing being formed to include a first section and a second section;

b. a chamber adapted to contain hydraulic fluid, the chamber having an inlet port, an outlet port and a volume, the chamber being located within the housing, the inlet port of the chamber being fluidly interconnected to a master cylinder and the outlet port of the chamber being fluidly interconnected to a brake mechanism;

c. a piston, the piston being generally cylindrical and coaxial with the longitudinal axis of the housing, the piston being located within the housing and being substantially surrounded by the second section of the housing;

d. a piston rod, the piston rod being affixed to the piston;

e. a trigger, the trigger being located within the housing and being substantially surrounded by the a first section of the housing, the trigger gripping the piston rod in first, armed configuration, thereby retaining the piston in a first position, the trigger releasing the piston rod in a second, unarmed configuration so that the piston may travel to a second position within the housing, thereby altering the volume of the chamber and thus activating the brake mechanism; and f. a trigger support, the trigger support being located within the housing, the trigger support being formed with a radially extending shoulder that acts as a barrier between the trigger and the piston.

2. The brake activation system of claim 1, wherein the piston rod comprises:

a. a first end, the first end being coaxial with a bore formed within the trigger support;

b. a second end, the second end being affixed to the piston; and c. a neck, the neck being integrally formed with the first end and the second end and joining the first end with the second end.

3. The brake activation system of claim 2, wherein the trigger is formed as a substantially cylindrical member residing within the first section of the housing, the trigger having a tapered bore, the tapered bore having a relatively wide diameter near the shoulder of the trigger support and having a relatively narrow diameter at stations progressively more distant from the shoulder.

4. The brake activation system of claim 3, wherein the trigger support further comprises an upper section integrally formed with the shoulder, the upper section residing within the first section of the housing and being symmetrical with respect to the longitudinal axis of the housing, the upper section having sidewall regions that are substantially perpendicular to the shoulder, the upper section being formed to include a plurality of substantially circular orifices passing through the sidewall regions.

5. The brake activation system of claim 4, further comprising a plurality of spherical bearings, each spherical bearing being capable of passing through any of the substantially circular orifices of the trigger support, each spherical bearing being adapted to reside within one of each of the circular orifices such that a portion of each spherical bearing abuts the neck of the piston rod and another portion of each bearing simultaneously abuts a sidewall of the tapered bore formed within the trigger, thereby gripping the neck of the piston rod when the trigger is in a position such that a lower edge of the trigger abuts the shoulder of the trigger support.

6. The brake activation system of claim 5, further comprising a trigger spring, the trigger spring residing within the first section of the housing and abutting the trigger, thereby biasing the trigger toward the shoulder of the trigger support.

7. The brake activation system of claim 6, further comprising a cable, the cable being attached to the trigger such that pulling the cable urges the trigger away from the shoulder of the trigger support.

8. The brake activation system of claim 2, further comprising a solenoid, the solenoid being mounted to the housing proximate the first end of the piston rod such that the solenoid urges the trigger toward the shoulder of the trigger support when the solenoid is activated.

9. An emergency brake system for use on a snowmobile to activate the brakes in the event that the snowmobile operator is thrown from the vehicle, comprising:

a. a tether, the tether being affixed to the operator such that pulling the tether beyond a preset limit will activate the snowmobile brakes;

b. a housing, the housing being interconnected to the tether, the housing being formed to include a hydraulic fluid reservoir and:

(i) a first conduit interconnecting the hydraulic fluid reservoir and a master cylinder: and (ii) a second conduit interconnecting the hydraulic fluid reservoir and the brakes;

c. a piston, the piston residing within the housing at a location adjacents the hydraulic fluid reservoir; and d. a trigger, the trigger being mounted within the housing, the trigger being affixed to the tether such that pulling the tether beyond the preset limit causes the piston to block the first conduit, thereby causing the first conduit to become disconnected from the hydraulic fluid reservoir and increasing pressure in the second conduit, thereby activating the brakes.

10. The emergency brake system of claim 9, wherein the tether becomes disconnected from the operator after the trigger is activated.

11. The emergency brake system of claim 10, wherein the housing further comprises:

a. an inner bore having a first diameter;

b. a first end, the first end being formed to include an opening through which the tether enters the housing and is attached to the trigger; and c. a second end being substantially opposite to the first end, the hydraulic fluid reservoir being formed as part of the inner bore adjacent to the second end.

12. The emergency brake system of claim 11, wherein the trigger further comprises:

a. an outer cylindrical shell; and b. a tapered inner bore, the tapered inner bore being formed in the shell, the tapered inner bore having a relatively narrower diameter nearer the first end of the housing and a relatively wider diameter nearer the second end of the housing.

13. The emergency brake system of claim 12, further comprising a trigger biasing spring, the trigger biasing spring being mounted within the inner bore of the housing and adjacent to the first end of the housing so as to urge the trigger toward the second end of the housing.

14. The emergency brake system of claim 13, further comprising a trigger support member, the trigger support member being mounted within the inner bore of the housing between the first end and the second end, the trigger support member being formed with an upper cylindrical section that extends toward the first end of the housing, the upper cylindrical section having a sidewall that is perforated by a plurality of circular orifices and having an inner bore that is substantially coaxial with the inner bore of the housing.

15. The emergency brake system of claim 14, further comprising:

a. the piston being mounted within the inner bore of the housing;

b. a main spring, the main spring being mounted within the inner bore of the housing between the piston and the trigger support member, the main spring biasing the piston toward the second end of the housing;

c. a piston rod, the piston rod being affixed to the piston, the piston rod having an indented neck region; and d. a plurality of spherical bearings mounted so as to abut the indented neck region of the piston rod while each spherical bearing protrudes through a single perforation in the sidewall of the upper cylindrical section of the trigger support member and abuts the tapered inner bore of the trigger, thereby gripping the piston rod and preventing movement of the piston toward the second end of the housing.

16. A method of applying the brakes of a snowmobile when the rider dismounts from the snowmobile, comprising the steps of:

a. tethering the rider to a housing mounted on the snowmobile;

b. routing a snowmobile brake line through the housing; and c. pressurizing the snowmobile brake line whenever the tether is stretched beyond a preset limit.

17. The method of claim 16, further comprising the steps of:

a. routing a conduit from a brake system master cylinder through the housing;

b. interconnecting the conduit and the brake line when the tether is in a first, dormant position; and c. disconnecting the conduit from the brake line when the tether is in a second, extended position.

18. The method of claim 17, further comprising the step of reconnecting the conduit to the brake line by activating the snowmobile brakes with a brake lever.

* * * * *